United States Patent
Xu

(10) Patent No.: US 9,598,967 B2
(45) Date of Patent: Mar. 21, 2017

(54) AIRFOIL MEMBER AND COMPOSITE PLATFORM HAVING CONTOURED ENDWALL

(71) Applicant: UNITED TECHNOLOGIES CORPORATION, Farmington, CT (US)

(72) Inventor: JinQuan Xu, Groton, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 1291 days.

(21) Appl. No.: 13/718,181

(22) Filed: Dec. 18, 2012

(65) Prior Publication Data

US 2014/0212292 A1    Jul. 31, 2014

(51) Int. Cl.
*F01D 5/28* (2006.01)
*F01D 5/30* (2006.01)
*F01D 5/14* (2006.01)

(52) U.S. Cl.
CPC .............. *F01D 5/30* (2013.01); *F01D 5/143* (2013.01); *F01D 5/145* (2013.01); *F01D 5/282* (2013.01); *F01D 5/284* (2013.01); *F01D 5/3084* (2013.01); *F01D 5/3092* (2013.01); *F05D 2240/80* (2013.01); *F05D 2300/603* (2013.01); *Y02T 50/672* (2013.01); *Y02T 50/673* (2013.01); *Y10T 29/49316* (2015.01)

(58) Field of Classification Search
CPC ........ F01D 5/143; F01D 5/145; F01D 5/3092; F01D 11/008
USPC ....................................................... 416/193 A
See application file for complete search history.

(56) References Cited

U.S. PATENT DOCUMENTS

| | | | | |
|---|---|---|---|---|
| 3,801,222 A | * | 4/1974 | Violette | F01D 5/3007 416/193 A |
| 4,019,832 A | * | 4/1977 | Salemme | F01D 11/008 416/135 |
| 4,343,593 A | * | 8/1982 | Harris | F01D 5/282 416/193 A |
| 4,802,824 A | * | 2/1989 | Gastebois | F01D 5/282 416/193 A |

(Continued)

FOREIGN PATENT DOCUMENTS

| | | |
|---|---|---|
| EP | 1801354 A2 | 6/2007 |
| EP | 2468434 A1 | 6/2012 |

OTHER PUBLICATIONS

International Search Report and Written Opinion for related International Application No. PCT/US13/63432; report dated Jan. 9, 2014.

(Continued)

*Primary Examiner* — Woody Lee, Jr.
(74) *Attorney, Agent, or Firm* — Cantor Colburn LLP

(57) ABSTRACT

An airfoil member and platform assembly for a gas turbine engine is provided. The platform to which the airfoil member is anchored is made of a composite material and includes an endwall defining a contoured region for improved aerodynamics. The contoured region influences the flow of gases through the flow passages between the airfoil members, thereby reducing endwall losses due to horseshoe vortexing. The composite material may be woven ceramic matrix composite fibers infiltrated with a ceramic matrix material or woven organic matrix composite fibers infiltrated with an organic matrix material.

17 Claims, 5 Drawing Sheets

(56) References Cited

U.S. PATENT DOCUMENTS

| | | | |
|---|---|---|---|
| 6,213,711 B1 * | 4/2001 | Muller | F01D 5/145 415/191 |
| 6,561,761 B1 * | 5/2003 | Decker | F04D 29/681 415/173.1 |
| 6,648,597 B1 * | 11/2003 | Widrig | F01D 9/044 415/200 |
| 6,696,144 B2 | 2/2004 | Holowczak et al. | |
| 7,134,842 B2 | 11/2006 | Tam et al. | |
| 8,210,803 B2 | 7/2012 | Schaff et al. | |
| 8,231,354 B2 * | 7/2012 | Campbell | B23P 15/04 416/193 A |
| 8,435,007 B2 * | 5/2013 | Morrison | F23M 5/04 29/888.025 |
| 8,647,066 B2 * | 2/2014 | Guimbard | F01D 5/143 416/193 A |
| 8,721,290 B2 * | 5/2014 | Darkins, Jr. | B22D 19/0054 29/889.71 |
| 9,085,985 B2 * | 7/2015 | Barr | F01D 5/143 |
| 9,212,560 B2 | 12/2015 | McCaffrey | |
| 2007/0148000 A1 * | 6/2007 | Marusko | F01D 5/282 416/193 A |
| 2010/0158696 A1 | 6/2010 | Pandey et al. | |
| 2010/0172749 A1 | 7/2010 | Mitsuhashi | |
| 2010/0189556 A1 | 7/2010 | Propheter-Hinckley et al. | |
| 2010/0303627 A1 * | 12/2010 | Megerle | F01D 5/143 416/179 |
| 2011/0044818 A1 * | 2/2011 | Kuhne | F01D 5/143 416/212 A |
| 2013/0004331 A1 * | 1/2013 | Beeck | F01D 5/143 416/97 R |
| 2013/0243604 A1 * | 9/2013 | Roussille | D03D 5/005 416/241 A |

OTHER PUBLICATIONS

European Supplementary Search Report and Communication; Application No. 13865462.9—1610/2935794; Dated Aug. 1, 2016; 8 pages.

* cited by examiner

AIRFOIL MEMBER AND COMPOSITE PLATFORM HAVING CONTOURED ENDWALL

FIELD OF THE DISCLOSURE

The subject matter of the present disclosure relates generally to an airfoil platform for a gas turbine engine. More particularly, the subject matter of the present disclosure relates to an airfoil member and a composite platform having a contoured woven endwall, and a method of forming the same.

BACKGROUND OF THE DISCLOSURE

Gas turbine engines, such as those used on jet aircrafts, generally comprise an air inlet, a fan, a single or multi-stage compressor, a combustion chamber aft (downstream) of the compressor, a single or multi-stage turbine, and an exhaust nozzle. Air entering the inlet flows through the compressor and into the combustion chamber where it is ignited. The hot combustion gases pass through the turbine and exit the exhaust nozzle, providing thrust.

The turbine is comprised of alternating rings of stationary vanes and rotating blades (collectively referred to as airfoils). The turbine blades are connected at their inner diameter ends to platforms having endwalls and extend radially outward therefrom. The platforms are connected to a rotor, which is connected to a shaft that rotates within the engine as the blades interact with the gas flow. Each platform typically comprises an axial retention slot or channel that receives the mating root portion of the blade.

The rings of radially extending stationary turbine vanes are located between the turbine blade rings. Each stationary turbine vane is mounted to a platform having an endwall.

During operation of the engine, the turbine airfoils, that is, the turbine blades and turbine vanes, are exposed to high heat from the combustion gases. In addition, the blades are subjected to high stresses from rotational forces. It is therefore a design challenge to develop materials for turbine blades and vanes that are more heat resistant to reduce airfoil cooling demands and are lighter to increase propulsive efficiencies in aircraft engines.

Typically, the airfoil members and their platforms are fabricated from high strength alloys. More recent airfoil member and its platform designs have attempted to incorporate a ceramic matrix composite (CMC) material, which is lightweight, heat resistant and strong. CMC material comprises a ceramic fabric that is infused with a ceramic matrix. The ceramic fabric is preformed to a desired shape and the matrix solidifies within the fabric to produce a part having the lightweight and heat resistant characteristics of the matrix and the strength characteristics of the fabric.

The rotating turbine blades drive the compressor. Like the turbine, the compressor is comprised of alternating rings of stationary vanes and rotating blades. Each ring is comprised of a plurality of radially extending airfoil members that are connected at their inner diameter ends to a platform having an endwall. Compressor airfoil member and/or its platform designs may incorporate an organic matrix composite (OMC) material.

CMC turbine airfoil member and platform assemblies and OMC compressor airfoil member and platform assemblies have the potential to revolutionize engine performance as they enable improved fuel efficiency, increased durability, higher thrust to weight ratio, and other benefits. To further enhance these benefits, the present disclosure provides an airfoil member and platform assembly in which the platform is made of a composite material and has an endwall that is contoured. Providing endwall contouring influences the flow of gases through the flow passages between the turbine blades and/or vanes, thereby reducing endwall losses due to horseshoe vortexing and improving aerodynamic performance.

Airfoils made from composite (CMC or OMC) materials offer good strength in its primary load path. Attaching a CMC or OMC platform onto the airfoil is difficult and especially challenging if the platform endwall is contoured.

SUMMARY OF THE DISCLOSURE

According to one embodiment of the disclosure an assembly comprising an airfoil member and a composite platform having a contoured endwall is provided.

The airfoil member has an airfoil portion and a root portion. The airfoil portion has a leading edge, a trailing edge, a first side such as a pressure side extending from the leading edge to the trailing edge, a second side such as a suction side extending from the leading edge to the trailing edge and a base near the root portion.

The platform is formed from a composite material and comprises an endwall extending in generally circumferentially opposite directions from either side of the airfoil portion. The platform defines a channel for receiving the root portion. The endwall has an outboard surface that faces a fluid flow passage and defines a contoured region.

The contoured region may comprise one or more concave regions and/or one or more convex regions. The contoured region may be adjacent the base of the airfoil portion. Portions of the contoured region may be upstream or downstream of the leading edge and trailing edge.

The airfoil member may be a turbine vane, turbine blade, compressor stator vane, compressor blade, mid-turbine frame vane or fan exit exhaust vane.

Where the airfoil member is a turbine blade, the blade may be made from plies of a woven ceramic matrix composite material infiltrated with a ceramic matrix material. The blade may be cantilevered from an inner diameter platform. The platform may be made from a plurality of ceramic matrix composite fibers infiltrated with a ceramic matrix material.

Where the airfoil member is a turbine vane, the vane may be made from plies of a woven ceramic matrix composite material infiltrated with a ceramic matrix material. The turbine vane may extend between an inner diameter platform and an outer diameter platform, where at least one of the platforms is made from a plurality of ceramic matrix composite fibers infiltrated with a ceramic matrix material.

Where the airfoil member is a compressor rotor blade, the rotor blade may be made from plies of an organic matrix composite material infiltrated with an organic matrix material. The rotor blade may be cantilevered from an inner diameter platform. The platform may be made from a plurality of organic matrix composite fibers infiltrated with an organic matrix material.

Where the airfoil member is a compressor stator vane, the stator vane may be made from plies of an organic matrix composite material infiltrated with an organic matrix material. The compressor stator vane may extend between an inner diameter platform and an outer diameter platform, where at least one of the platforms is made from a plurality of organic matrix composite fibers infiltrated with an organic matrix material.

In another aspect of the disclosure a method of making an airfoil member and platform assembly is provided. The method comprises the steps of forming an airfoil member having an airfoil portion and a root portion; forming a platform from a composite material, the platform and the airfoil member partly defining a fluid flow passage, the platform having an endwall having a surface that faces the fluid flow passage and that defines a contoured region, the platform having a pair of feet extending substantially radially away from the endwall, the endwall and the feet defining an axially oriented channel having a channel wall; and inserting the root portion of the airfoil member into the channel so that the root portion abuts the channel wall.

The airfoil member may be formed from a composite material by laying up plies of a composite material in a mold and infiltrating the plies with a matrix material. The platform may be formed by providing a plurality of chopped composite material fibers and infiltrating the fibers with a matrix material. The airfoil member may be bonded to the platform by, for example, introducing composite material along areas of contact between the root portion and the platform and then heating the assembly.

Where the airfoil member is a turbine blade or turbine vane the composite material may be a ceramic composite material. Where the airfoil member is a compressor stator vane or a compressor rotor blade the composite material may be an organic composite material.

In cases where the airfoil member is anchored at both radial ends, the airfoil portion of the airfoil member may have opposing radial ends and a root portion extending from either radial end. In such cases the method may comprise forming an inner diameter platform and an outer diameter platform wherein both platforms partly define the fluid flow passage. Each platform comprises feet and an endwall having a surface that faces the fluid flow passage, wherein the feet and endwall define an axially oriented channel. At least one of the endwalls defines a contoured region. The root portion at either radial end of the airfoil member is inserted into one of the respective channels.

BRIEF DESCRIPTION OF THE DRAWINGS

So that the manner in which the concepts of the present disclosure may be understood in detail, a more particular description is provided by reference to the embodiments which are illustrated in the accompanying drawings. It is to be noted, however, that the appended drawings illustrate only typical embodiments and are therefore not to be considered limiting of its scope, for the concepts of the present disclosure may admit to other equally effective embodiments. Moreover, the drawings are not necessarily to scale, emphasis generally being placed upon illustrating the principles of certain embodiments.

Thus, for further understanding of these concepts and embodiments, reference may be made to the following detailed description, read in connection with the drawings in which.

DETAILED DESCRIPTION

The present disclosure relates to an airfoil member and platform assembly in which the platform is made of composite material, preferably either CMC or OMC, and has a contoured endwall. Although the disclosure will now be described with regard to a turbine blade and platform assembly, it should be understood that the disclosure may be used with any suitable airfoil member and platform where aerodynamic efficiency is desired, including a turbine vane and platform assembly, a mid-turbine frame (MTF) airfoil and platform assembly, a compressor stator vane and platform assembly, a compressor rotor blade and platform assembly, a fan blade and platform assembly, and a fan exit guild vane and platform assembly.

Figure 1:
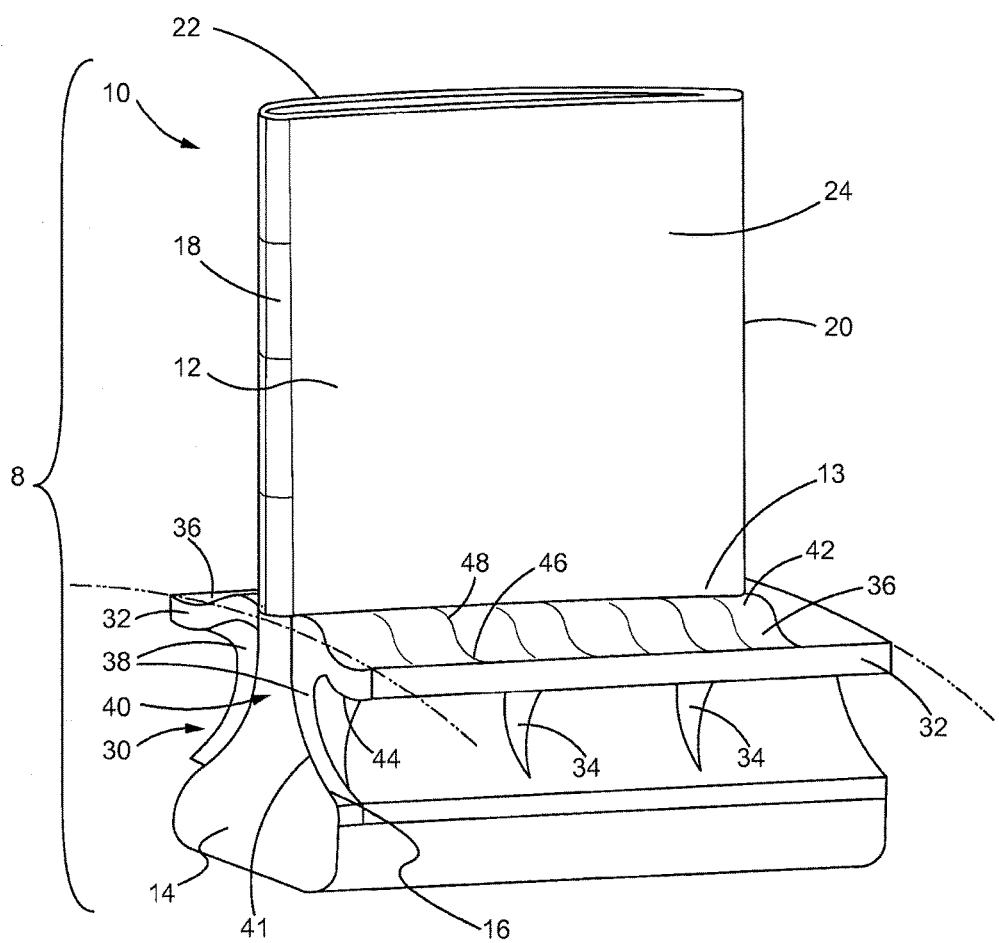
FIG. 1 is a perspective view of a turbine blade and platform assembly according to the disclosure.

FIG. 1 is a perspective view of a turbine blade and platform assembly 8 for a gas turbine engine according to the disclosure. The assembly 8 comprises a turbine blade 10 and a platform 30. The turbine blade 10 is mounted to the platform 30 as described in more detail below.

Figure 2:
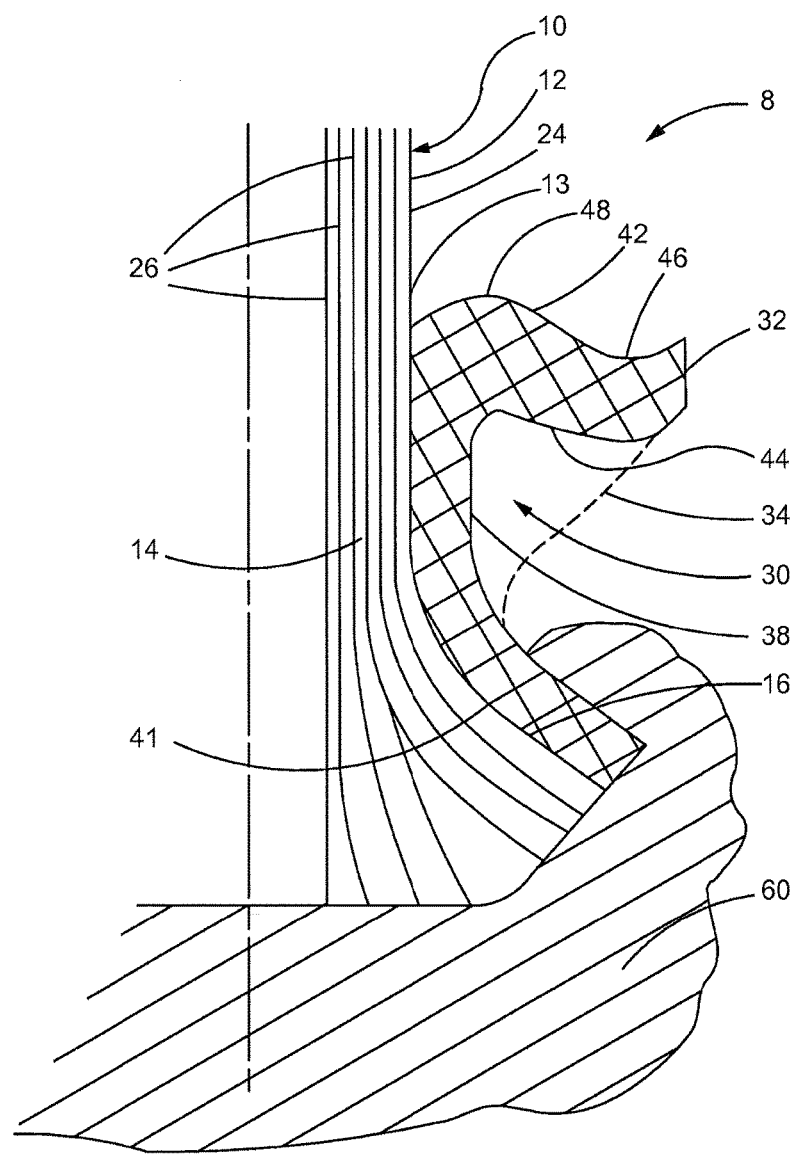
FIG. 2 is a cross-sectional view of one half of a turbine blade and platform assembly according to the disclosure.

FIG. 2 is a cross sectional view of one half of a turbine blade and platform assembly 8 shown affixed to a disk 60. The disk 60 may be affixed to a rotatable shaft (not shown).

The turbine blade 10 comprises an airfoil portion 12, which is generally that portion of the turbine blade 10 extending above the platform 30 (or between the platforms in the case of a vane carried between an inner diameter platform and an outer diameter platform), and a root portion 14. The airfoil portion 12 has a base 13 in close proximity to the root portion 14. The root portion 14 has an outer surface 16. The airfoil portion 12 has a leading edge 18, a trailing edge 20, a first side such as a pressure side 22 and a second side such as a suction side 24, each side extending from the leading edge 18 to the trailing edge 20. The airfoil portion 12 and the root portion 14 may be an integral structure formed from metal, composite material or any other suitable material.

The platform 30 comprises an endwall 32 supported by optional buttresses 34. The endwall 32 may be thought of as comprising a pair of endwall sections 36 extending in generally circumferentially (with respect to the engine shaft) opposite directions from either side of the turbine blade 10. The platform 30 further comprises a pair of feet 38 extending substantially radially inwardly from the endwall 32, where "inwardly" is defined as being in the general direction of the engine shaft. FIG. 2 shows only one endwall section 36 and one foot 38. Together the endwall sections 36 and the feet 38 define an axially oriented slot or channel 40 for receiving the root portion 14 of the turbine blade 10. The channel facing surfaces of the feet 38 serve as a channel wall 41.

The endwall 32, and thus the endwall sections 36, have an upwardly facing outboard surface 42 (facing away from the engine shaft and toward a fluid flow passage defined at least in part by the endwall 32 and by adjacent airfoil portions 12), and an inboard surface 44 facing toward the disk 60 and the engine shaft.

In one aspect of the disclosure the platform 30 is shaped so that the endwall 32 and thus the endwall sections 36 are contoured. The location and dimensions of the contours, that is, the concave and convex regions, may be such as to maximize the aerodynamic efficiency of the turbine. That is, the contours may be designed to optimize turbine performance.

For example and without limitation, in the platform 30 shown in FIGS. 1 and 2 the outboard surface 42 of the endwall 32 comprises a bowl shaped or concave region 46 (when viewed from outboard the endwall section 36) and/or a bulge or convex region 48. The convex region 48 extends substantially axially (in the direction of fluid flow) from the turbine blade leading edge 18 to the trailing edge 20 and is adjacent the base 13 of the airfoil portion 12. The concave region 46 also extends substantially axially from the turbine blade leading edge 18 to the trailing edge 20 but is distant (spaced apart from) the base 13. The convex region 48 merges into (adjoins) the airfoil portion 12 of the turbine blade 10.

The contoured regions may extend upstream of the leading edge 18 and/or downstream of the trailing edge 20.

As noted above, the airfoil member, including the airfoil portion 12 and the root portion 14, may be a turbine blade or turbine vane and may be made from metal or plies 26 of a ceramic matrix composite material infiltrated with a ceramic matrix material, while the platform 30 may be made from composite material such as a plurality of ceramic matrix composite fibers infiltrated with a ceramic matrix material.

Alternatively, the airfoil member may be a compressor rotor blade or a compressor stator vane and may be made from metal or plies of an organic matrix composite material infiltrated with an organic matrix composite material. The platform for the compressor rotor blade or compressor stator vane may be made from composite material such as a plurality of organic matrix composite fibers infiltrated with an organic matrix composite material.

The airfoil member may also be a mid-turbine frame vane or fan exit exhaust vane.

Figure 3:
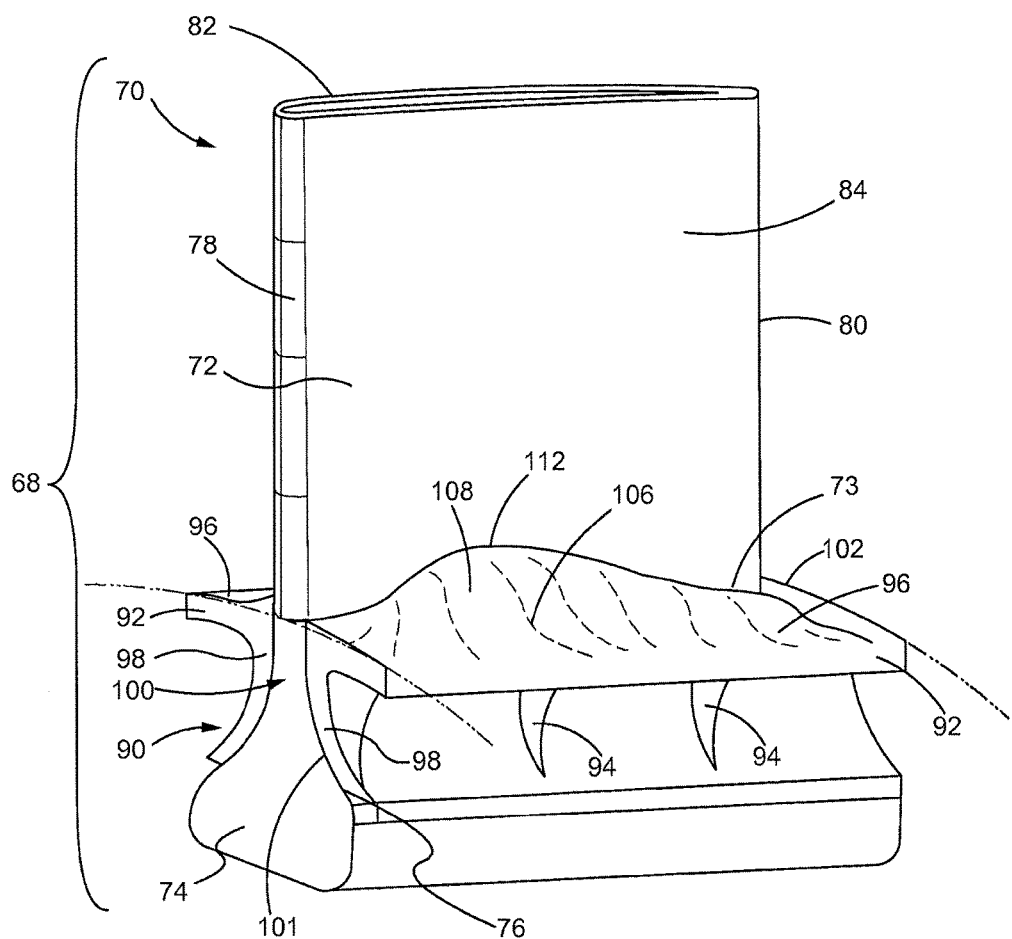
FIG. 3 is a perspective view of another embodiment of a turbine blade and platform assembly according to the disclosure.
Figure 5:
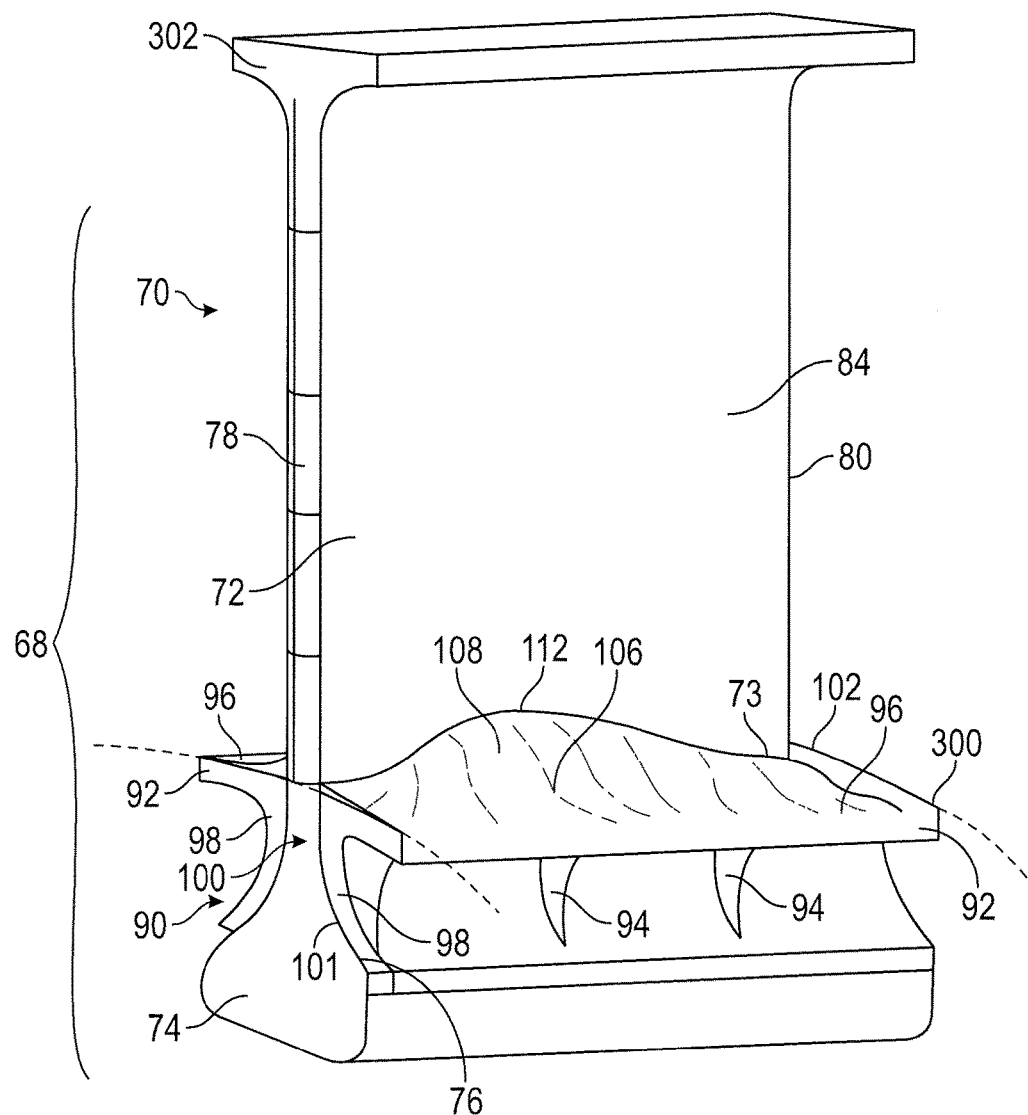
FIG. 5 is a cross-sectional view of an embodiment of an assembly of a turbine blade extending between an inner diameter platform and an outer diameter platform.

Referring to FIG. 5, in some cases the airfoil member may be anchored at both ends. For example, turbine vanes, compressor stator vanes, mid-turbine frame vanes and fan exit guide vanes typically extend between concentric rings and are anchored at one end by an inner diameter (ID) platform 300 and at the other end by an outer diameter (OD) platform 302. While FIGS. 1, 2 and 3 are described in the context of an ID platform, it is to be appreciated that the structure shown may also represent the OD platform. The ID and OD platforms 300, 302 and the airfoil members define the fluid flow passages. One or both platforms may comprise a composite endwall having a contoured surface that faces the fluid flow passage.

In all cases, the platform to which the airfoil member is anchored is made from a composite material such as CMC or OMC and comprises an endwall having a contoured surface.

While FIG. 1 shows an endwall 32 having a concave region and a convex region in a substantially uniform two-dimensional configuration, that is, the contouring is substantially uniform in the axial direction, the present disclosure is intended to cover numerous alternative embodiments, another of which will now be described.

FIG. 3 is a perspective view of another embodiment of a turbine blade and platform assembly 68 for a gas turbine engine. Like the first embodiment, the assembly 68 comprises a turbine blade 70 mounted to a platform 90. Also like the first embodiment the turbine blade 70 has an airfoil portion 72 generally extending above the platform 90 and a root portion 74 having an outer surface 76. The airfoil portion 72 has a leading edge 78, a trailing edge 80, a first side such as a pressure side 82 and a second side such as a suction side 84, each extending from the leading edge 78 to the trailing edge 80. The airfoil portion 72 has a base 73 in close proximity to the root portion 74. The airfoil portion 72 and the root portion 74 may be an integral structure formed from metal or from a CMC material having plurality of plies 26.

The platform 90 comprises an endwall 92 supported by optional buttresses 94. The endwall 92 may be thought of as comprising a pair of endwall sections 96 extending in generally circumferentially opposite directions from either side of the turbine blade 70. The platform 90 further comprises a pair of feet 98 extending substantially radially inwardly from the endwall 92. Together the endwall sections 96 and the feet 98 define a substantially axially oriented channel 100 for receiving the root portion 74 of the turbine blade 70. The channel 100 has a bore or channel wall 101.

The endwall 92, and thus the endwall sections 96, have an upwardly facing outboard surface 102 that faces toward the fluid flow passage. Like in the first embodiment, the endwall 92 is contoured, except the contouring is not two-dimensional, that is, the contouring is not substantially uniform in the axial direction. Instead, the contouring is non-uniform in the axial direction.

Specifically, the endwall 92 comprises a generally concave region 106 and/or a generally convex region 108. As should be apparent in FIG. 3, the convex region 108 has an area of maximum convexity 112 (a local maximum in the radial direction) adjacent the airfoil portion 72 of the turbine blade 70 about midway between the leading edge 78 and the trailing edge 80.

A similar or different contouring may exist on the opposite endwall section 96 which is mostly obscured by the airfoil portion 72 in FIG. 3.

It should be understood that the contouring can be any suitable configuration that improves the aerodynamic efficiency of the turbine. For example and without limitation, the endwall may comprise areas of convexity only, concavity only, or both. The endwall may comprise more complex configurations than those shown in the figures, and may include multiple areas of convexity and concavity. Portions of the concave region(s) and/or the convex region(s) may be upstream of the leading edge and/or downstream of the trailing edge.

Method of Manufacturing an Airfoil Member and Platform Assembly

In another aspect of the disclosure a method of making an aerodynamically efficient airfoil member (such as a turbine blade 10) and platform assembly is provided. The assembly 8 or 68 may be made partly according to a method generally disclosed in co-owned U.S. patent application Ser. No. 13/173,308, incorporated herein by reference.

Figure 4:
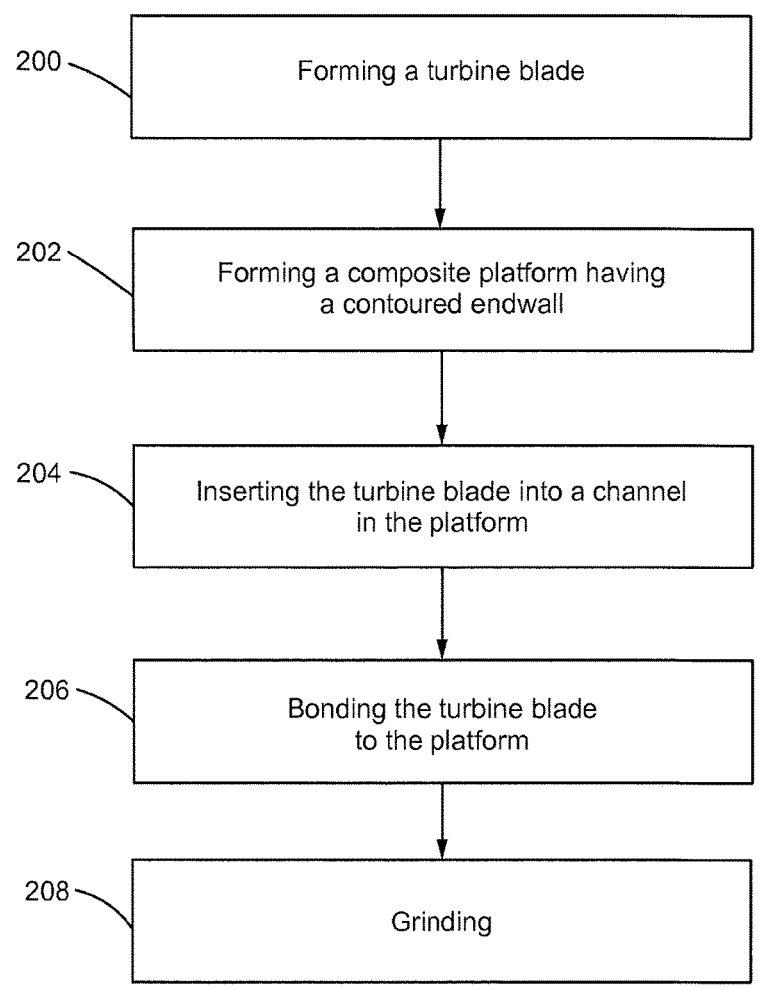
FIG. 4 is a flow chart showing a method of making a turbine blade and platform assembly according to the disclosure.

Referring to FIG. 4, the method includes the step 200 of forming the turbine blade 10, 70. The turbine blade 10, 70 may be made from metal, composite (such as CMC or OMC) or any suitable material. Preferably, the turbine blade 10, 70 is made by laying up plies 26 of a ceramic matrix composite (CMC) material or any suitable woven fabric material(s) in a mold, and infiltrating the plies with a ceramic matrix material. The plies 26 may be formed from a unidirectional tape and/or fabric or woven material such that a strong primary structure is created that can transmit the radial pull of the airfoil portion 12, 72 into the root portion 14, 74. After the plies have been laid up, they may be joined together to form the turbine blade 10, 70 using low temperature polymerization, high temperature polymerization and/or pyrolysis techniques, or bonding with a silicon interfacial layer.

According to step 202, the platform 30, 90 is formed from a composite material and shaped so that it has a contoured endwall. For example, the platform 30 may be formed using a plurality of three-dimensional or chopped woven CMC fibers which have been infiltrated by a matrix material. Bonding of the matrix material to the CMC fibers may be accomplished using low temperature polymerization and/or pyrolysis, or bonding with a silicon interfacial layer. The platform 30, 90 may be formed in a mold to have a channel 40, 100 which extends radially inward from the outboard surface 42, 102 of the endwall 32, 92.

The fibers used to form the CMC platform 30, 90 may include fibers such as silicon carbide, aluminum oxide, silicone nitride, carbon, and combinations thereof. The matrix used to form the CMC platform 30, 90 and/or the turbine blade 10, 70 may include magnesium aluminum silicate, magnesium barium aluminum silicate, lithium aluminum silicate or other compounds.

The mold used to shape the platform 30, 90 is configured to impart a contoured shaped onto the endwall 32, 92. Providing endwall contouring influences flow of gases through the flow passages between the turbine blades 10, 70, thereby reducing endwall losses due to horseshoe vortexing and improving aerodynamic performance.

In step 204, the turbine blade 10, 70 is inserted into the channel 40, 100 in the platform 30, 90 so that the outer surface 16, 76 of the root portion 14, 74 abuts the channel wall 41, 101.

In step 206, the turbine blade 10, 70 is bonded to the platform 30, 90. The bonding step may be carried out by introducing matrix material and heating the assembly to densify the CMC material and bond the root portion 14, 74 to the platform 30, 90.

In step 208, any protruding portions, such as fibers, may be ground off to provide a finished assembly 8, 68.

A similar method of manufacturing may be applied to other airfoil assemblies. For example, for a compressor rotor blade and platform assembly, the rotor blade may be manufactured by laying up plies of fabric materials for an organic matrix composite (OMC) material in a mold and infiltrating the plies with an organic matrix material. The rotor blade platform may be formed in a similar manner to that of the rotor blade. For example, the rotor blade platform may be formed using a plurality of three-dimensional or chopped OMC fibers which have been infiltrated by an organic matrix material. The mold used to shape the platform is configured to impart a contoured shaped onto the endwall. The rotor blade is inserted into a channel in the platform so that the outer surface of the root portion of the rotor blade abuts the channel wall. The compressor rotor blade is then bonded to the platform by any suitable means, such as introducing matrix material and heating the assembly to densify the OMC material and bond the blade root to the platform.

While the present disclosure has shown and described details of exemplary embodiments, it will be understood by one skilled in the art that various changes in detail may be effected therein without departing from the spirit and scope of the disclosure as defined by claims that may be supported by the written description and drawings. Further, where these exemplary embodiments (and other related derivations) are described with reference to a certain number of elements it will be understood that other exemplary embodiments may be practiced utilizing either less than or more than the certain number of elements.

For example, while the present disclosure has been described in the context of a turbine blade and platform assembly, the disclosure could also be applied to any suitable airfoil and platform assembly where aerodynamic efficiency is desired, including a turbine vane and CMC platform assembly, a turbine blade and CMC platform assembly, a mid-turbine frame airfoil and CMC platform assembly, a compressor stator vane and OMC platform assembly, a compressor rotor blade and OMC platform assembly, a fan blade and OMC platform assembly, and a fan exit guild vane and OMC platform assembly.

What is claimed is:

1. An assembly comprising:
   an airfoil member having an airfoil portion and a root portion, the airfoil portion having a leading edge, a trailing edge, a first side extending from the leading edge to the trailing edge, a second side extending from the leading edge to the trailing edge and a base near the root portion; and
   at least one platform defining a channel for receiving the root portion, the at least one platform formed from a composite material and comprising an endwall extending in generally circumferentially opposite directions from either side of the airfoil portion, the endwall having an outboard surface comprising a contoured region, the contoured region including at least one convex region and at least one concave region at a same circumferential side of the airfoil, the at least one convex region extending uniformly in an axial direction from the leading edge to the trailing edge and the at least one concave region extending uniformly in the axial direction from the leading edge to the trailing edge.

2. The assembly of claim 1 wherein:
   the contoured region is adjacent the base of the airfoil portion.

3. The assembly of claim 1 wherein:
   a portion of the contoured region extends upstream of the leading edge.

4. The assembly of claim 1 wherein:
   a portion of the contoured region extends downstream of the trailing edge.

5. The assembly of claim 1 wherein:
   the airfoil member is a turbine blade; and
   the at least one platform is made from a plurality of ceramic matrix composite fibers infiltrated with a ceramic matrix material.

6. The assembly of claim 1 wherein:
   the airfoil member is a turbine vane and extends between an inner diameter platform and an outer diameter platform; and
   at least one of the inner diameter platform and outer diameter platform is made from a plurality of ceramic matrix composite fibers infiltrated with a ceramic matrix material.

7. The assembly of claim 1 wherein:
   the airfoil member is a compressor rotor blade; and
   the at least one platform is made from a plurality of woven organic matrix composite fibers infiltrated with an organic matrix material.

8. The assembly of claim 1 wherein:
   the airfoil member is a compressor stator vane, the compressor stator vane extending between an inner diameter platform and an outer diameter platform; and at least one of the inner diameter platform and outer diameter platform is made from a plurality of woven organic matrix composite fibers infiltrated with an organic matrix material.

9. The assembly of claim 1 wherein:
the airfoil member is made from a composite material.

10. A method of making an airfoil member and platform assembly comprising the steps of:
   a. forming an airfoil member, the airfoil member having an airfoil portion and a root portion;
   b. forming a platform from a composite material, the platform and the airfoil portion partly defining a fluid flow passage, the platform having an endwall having a surface that faces the fluid flow passage and that comprises a contoured region, a pair of feet extending substantially radially away from the endwall, the endwall and the feet defining a channel having a channel wall; and
   c. inserting the root portion of the airfoil member into the channel so that the root portion abuts the channel wall;
   wherein the contoured region includes at least one convex region and at least one concave region at a same circumferential side of the airfoil, the at least one convex region extending uniformly in an axial direction from the leading edge to the trailing edge and the at least one concave region extending uniformly in the axial direction from the leading edge to the trailing edge.

11. The method of claim 10 wherein:
step (b) comprises forming the platform by providing a plurality of chopped composite material fibers and infiltrating the fibers with a matrix material.

12. The method of claim 10 comprising the further step of:
d. bonding the airfoil member to the platform.

13. The method of claim 12 wherein:
step (d) includes the steps of introducing composite material along areas of contact between the root portion and the platform and heating the assembly.

14. The method of claim 10 wherein:
the airfoil member is a turbine blade or turbine vane; and
the composite material is a ceramic matrix composite material.

15. The method of claim 10 wherein:
the airfoil member is a compressor stator vane or a compressor rotor blade; and
the composite material is an organic matrix composite material.

16. The method of claim 10 wherein:
during step (a) the airfoil member is formed by laying up plies of a composite material and infiltrating the plies with a matrix material.

17. The method of claim 10 wherein:
step (a) further comprises forming an airfoil member having an airfoil portion with opposing radial ends and a root portion extending from either radial end;
step (b) further comprises forming an inner diameter platform and an outer diameter platform, both the inner diameter platform and the outer diameter platform partly defining the fluid flow passage, each of the inner diameter platform and the outer diameter platform comprising feet and an endwall having a surface that faces the fluid flow passage wherein the feet and endwall define a channel, at least one of the endwalls defining a contoured region; and
step (c) further comprises inserting the root portion at either radial end of the airfoil member into both channels.

\* \* \* \* \*